(12) United States Patent
Lingelbach (10) Patent No.: US 9,746,696 B2
(45) Date of Patent: Aug. 29, 2017

(54) CONTRAST ENHANCING FILTER FOR EYE GLASSES AND CONTRAST ENHANCING EYE GLASS

(71) Applicant: Carl Zeiss Vision Italia S.p.A., Castiglione Olona-Varese (IT)

(72) Inventor: Bernd Lingelbach, Abtsgmuend-Leinroden (DE)

(73) Assignee: Carl Zeiss Vision Italia S.P.A., Castiglione Olona-Varese (IT)

( * ) Notice: Subject to any disclaimer, the term of this patent is extended or adjusted under 35 U.S.C. 154(b) by 0 days.

(21) Appl. No.: 14/802,921

(22) Filed: Jul. 17, 2015

(65) Prior Publication Data

US 2015/0323813 A1 Nov. 12, 2015

Related U.S. Application Data

(63) Continuation of application No. PCT/EP2013/000138, filed on Jan. 17, 2013.

(51) Int. Cl.
G02C 7/10 (2006.01)

(52) U.S. Cl.
CPC ............... *G02C 7/104* (2013.01); *G02C 7/10* (2013.01); *G02C 7/108* (2013.01)

(58) Field of Classification Search
CPC .......... G02C 7/10; G02C 7/104; G02C 7/108; G02C 7/12

(Continued)

(56) References Cited

U.S. PATENT DOCUMENTS 3,516,720 A * 6/1970 Mauer ................. A61F 9/022
351/159.63
5,574,517 A 11/1996 Pang et al.
(Continued)

FOREIGN PATENT DOCUMENTS

DE 31 13 833 A1 10/1982

OTHER PUBLICATIONS

Jendrusch, G. et al, "Im "Blindflug" ueber die Piste", DOZ Mar. 2010, pp. 30 to 33.

(Continued)

*Primary Examiner* — Huy K Mai
(74) *Attorney, Agent, or Firm* — Walter Ottesen, P.A.

(57) ABSTRACT

An optical filter for eye glasses, in particular suitable for spectacle lenses or ski goggles, has a spectral power transmission curve of optical radiations. The spectral power transmission curve exhibits a local maximum spectral transmission ($T_{max}$) of radiations in a first wavelength range ($\Delta\lambda_{max}$). The first wavelength range ($\Delta\lambda_{max}$) is between 380 nm and 420 nm. The spectral power transmission curve exhibits spectral transmissions (T) of radiation in a second wavelength range ($\Delta\lambda_{th}$) which are lower than an upper threshold spectral transmission ($T_{th,u}$). The second wavelength range ($\Delta\lambda_{th}$) is between 420 nm and 500 nm and the upper threshold spectral transmission ($T_{th,u}$) is smaller than the maximum spectral transmission ($T_{max}$). The maximum spectral transmission ($T_{max}$) is larger than 21%.

27 Claims, 7 Drawing Sheets

(58) Field of Classification Search
USPC .................. 351/44, 159.6, 159.63, 159.65
See application file for complete search history.

(56) References Cited

U.S. PATENT DOCUMENTS

| | | |
|---|---|---|
| 6,794,066 B2 | 9/2004 | Macchi et al. |
| 8,329,775 B2* | 12/2012 | Laredo .................. C09B 29/12 252/582 |
| 2011/0211154 A1* | 9/2011 | Aoyama ............. G02B 5/3033 351/49 |

OTHER PUBLICATIONS

Jendrusch, G. et al, "Optimales Sehen und Filtereinsatz beim Schneesport-Mythen und Fakten", DOZ, Nov. 2012, pp. 1 to 7.
Jendrusch, G. et al, "Farbfilter und polarisierende Filter beim Schneesport", Aktuelle Kontaktologie, vol. 8, May 31, 2012, pp. 24 to 28.
Jendrusch, G. et al, "Zur Wirkung von Farbfiltern und polarisierenden Filtern beim Schneesport", DOZ Nov. 2011, pp. 2 to 5.
Jendrusch, G. et al, "Gut Sehen im Schnee", Optometrie Apr. 2010, pp. 4 to 11.
Jendrusch, G. et al, "Durchblick . . . nicht nur fuer die Olympischen Winterspiele", DOZ Feb. 2010, pp. 29 to 31.
Lingelbach, B. et al, "Contrast Enhancing Filters in Ski Spoils", Journal of ASTM International, Jan. 2005, vol. 2, No. 1, Paper ID JAI11972, pp. 1 to 8.
Lingelbach, B. et al, "Polarizing Filters in Ski Sports", Journal of ASTM International, vol. 7, No. 10, 2010, Paper ID JAI102826, pp. 1 to 7.
Coloring Plastic Lenses, Section 1; Mixing BPI Tints; 9 Easy Steps to perfect lenses www.callbpi.com/support/techsup1.html retrieved Dec. 11, 2013, pp. 1 and 2.
Coloring Plastic Lenses, Section 2; Coloring Plastic Lenses; Quickly and easily www.callbpi.com/support/techsup2.html retrieved Dec. 11, 2013, pp. 1 to 3.
Advanced tinting processes on today's lenses www.callbpi.com/support/techsup3.html retrieved Dec. 11, 2013, pp. 1 to 3.
Polycarbonates; How to tint them www.callbpi.com/support/poly.html retrieved Dec. 11, 2013, one page.
Color corrections, mixing tints, tinting times www.callbpi.com/pdf-cat/10tspp_4.pdf retrieved Dec. 11, 2013, one page.
Tinting Seiko Diacoat Lenses www.callbpi.com/support/tintgde.html retrieved Dec. 11, 2013, pp. 1 and 2.
Extract from "European Lenses & Technology", Interview with Dr. H.A. Wertheim; Sep. 1998, 1998 Jobson Publishing L.L.C. www.callbpi.com/support/w-interv.html, pp. 1 to 3.
Sistema de tintado BPI para lentes organicas www.callbpi.com/support/sistinta.html, retrieved Dec. 11, 2013, pp. 1 to 5.
BPI Winter Sun; Chase the Winter Blues Away www.callbpi.com/support/chablaw.html, retrieved Dec. 11, 2013, one page.
Special Tinted Lenses www.callbpi.com/support/speclens.html retrieved Dec. 11, 2013, one page.
University researchers have found that more than 85% of dyslexics are helped by tinted lenses www.callbpi.com/support/dyslex.html retrieved Dec. 11, 2013, one page.
Arcticle and papers about dyslexia www.callbpi.com/support/dyslexia.html retrieved Dec. 11, 2013, pp. 1 to 5.
Parkinson's disease and tinted lenses www.callbpi.com/support/parklens.html retrieved Dec. 11, 2013, one page.
Extract from Neuro-Ophthalmology; Article written by Marianne Doran, Nov./Dec. 2005 www.callbpi.com/support/fl-41.html retrieved Dec. 11, 2013, one page.
Tinted Lenses and Childhood Migraine www.callbpi.com/support/migraine.html retrieved Dec. 11, 2013, one page.
Epilepsy and blue lenses www.callbpi.com/support/epilepsy.html retrieved Dec. 11, 2013, one page.
International Search Report and Written Opinion of the European Patent Office dated Jul. 15, 2013 in international patent application PCT/EP2013/000138 on which the claim of priority is based.
Lingelbach, B., "Contrast-enhancing filters", Technologie, DOZ Aug. 1995, pp. 20 to 28 and English translation hereof.

* cited by examiner

CONTRAST ENHANCING FILTER FOR EYE GLASSES AND CONTRAST ENHANCING EYE GLASS

CROSS REFERENCE TO RELATED APPLICATION

This application is a continuation application of international patent application PCT/EP2013/000138, filed Jan. 17, 2013, designating the United States, the entire content of which is incorporated herein by reference.

FIELD OF THE INVENTION

The invention relates to a filter for eye glasses, in particular a filter for ski goggles.

BACKGROUND OF THE INVENTION

Sunglasses or sun glasses are a form of protective eyewear configured primarily to prevent bright sunlight and high-energy visible light from damaging or discomforting the eyes. There are sun glasses without any eyesight correcting properties and others having in addition to the eye protecting properties or vision enhancing properties the practical purpose of correcting eyesight, in particular of correcting ametropia, such as myopia or hyperopia, or of correcting presbyopia. Flip-up sunglasses add the benefits of sunglasses to corrective eyeglasses, allowing the wearer to flip up the tinted lenses for indoor use. An alternative are clip-on glasses.

The human eye shows a tremendous chromatic aberration. In particular, blue light is focused in front of the retina, yellow light is focused on the retina, and the focus of red light is located behind the retina. Therefore, in the presence of blue light a blue curtain covers the image of the objects the person is looking at, which reduces the contrast in the image.

Figure 2:
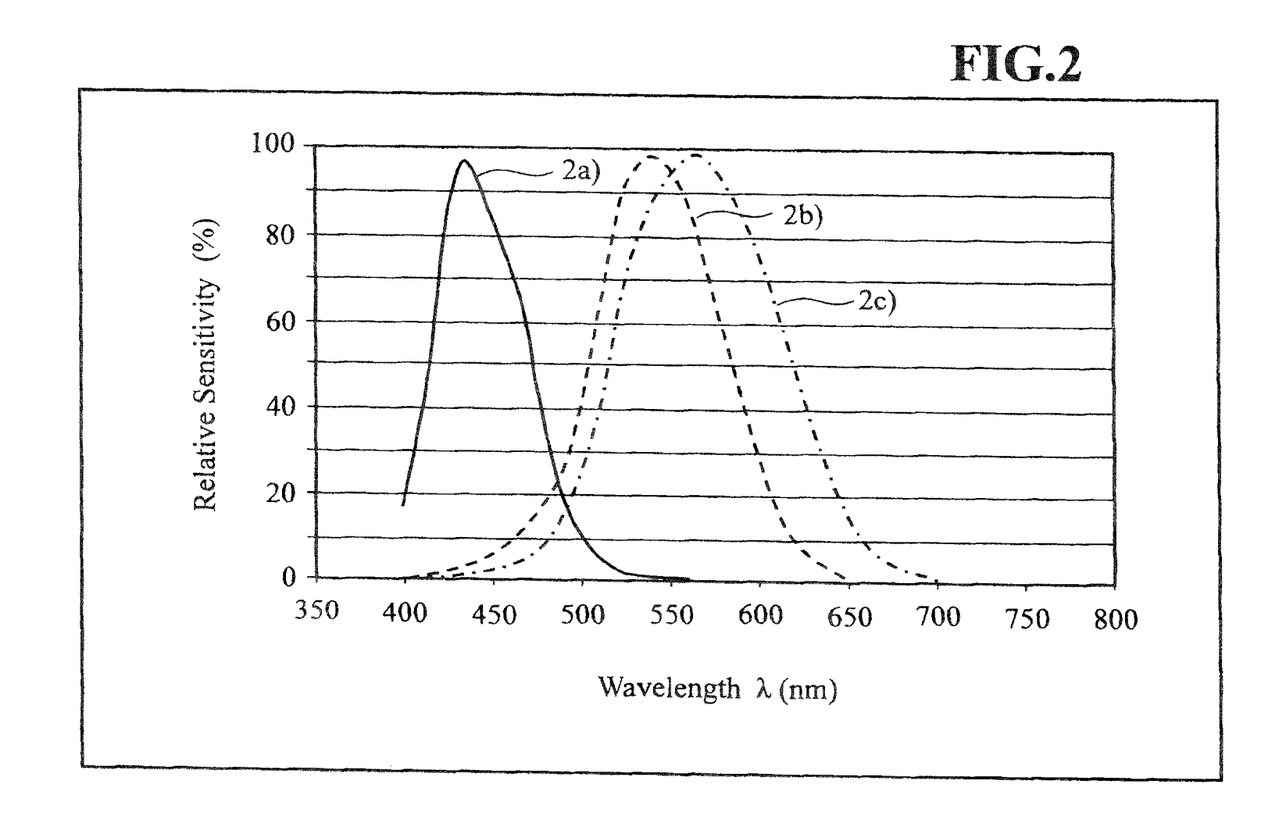
FIG. 2 shows relative sensitivity curves of the photoreceptors in the eye for S-cones (solid) (curve 2a), M-cones (dashed) (curve 2b) and L-cones (dash-dotted) (curve 2c)

For photopic vision, the fovea of the human eye is covered by three types of photoreceptors, the so called cones. According to the range of their sensitivity, they are called S-, M-, and L-cones (that is, corresponding to short, middle, and long wavelengths $\lambda$). FIG. 2 shows the sensitivity curves of the photoreceptors in the eye. They have a broadband characteristic. The short wavelength receptors, namely the S-cones, are sensitive to light in the wavelength $\lambda$ range between 380 nm and 550 nm, that is, to blue light, only. The middle wavelength receptors, namely the M-cones, are sensitive to light in the wavelength $\lambda$ range between 420 nm and 650 nm. The long wavelength receptors, namely the L-cones, are sensitive to light in the wavelength $\lambda$ range between 420 nm and 700 nm. Thus, the mean wavelength receptors M and the long wavelength receptors L are not only sensitive to red and green light but also to blue light of about 450 nm.

The different types of cones are not equally distributed on the retina. There are no solely blue sensitive S-cones in the fovea. In the presence of blue light, therefore, the difference between L- and M-cone inputs is relatively reduced, and as a consequence the contrast is reduced.

Figure 3:
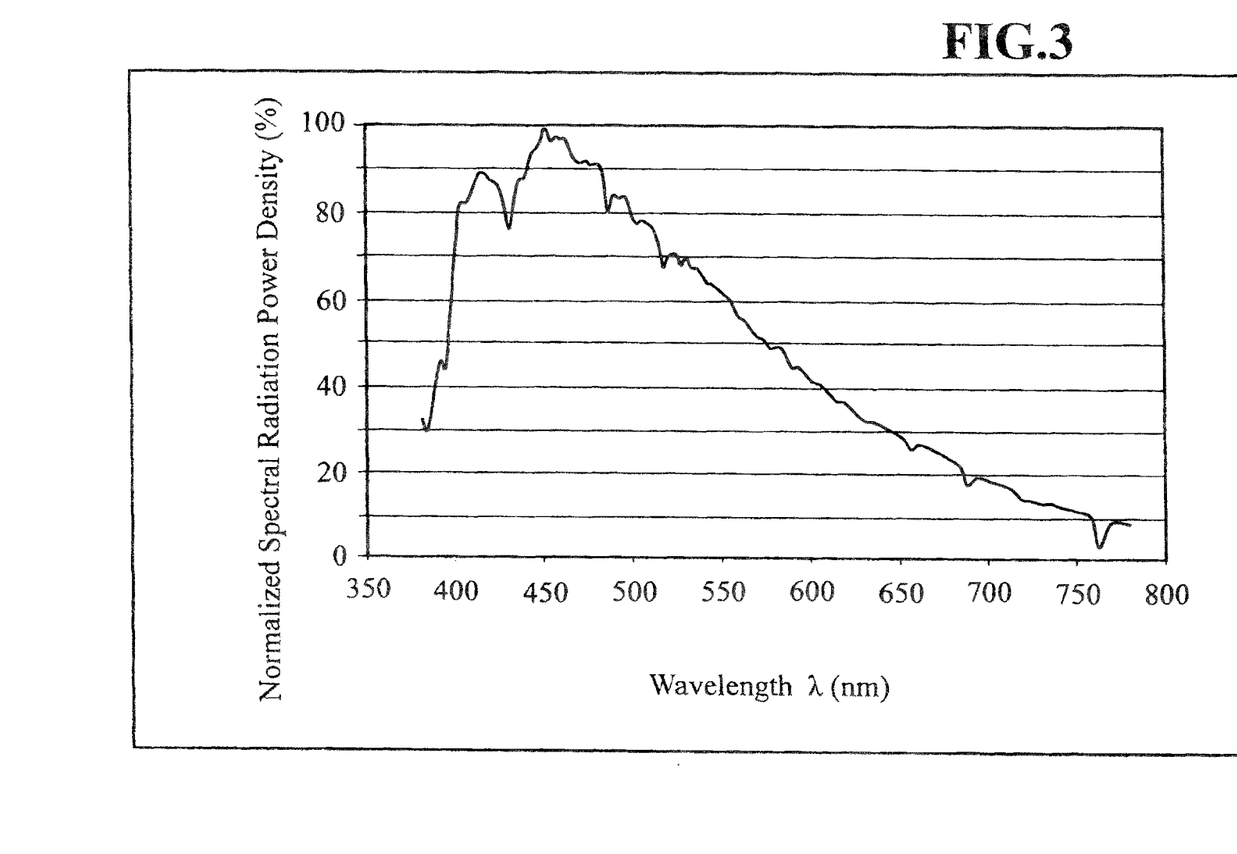
FIG. 3 is a spectral distribution of a blue sky.

FIG. 3 shows the power spectrum of a blue sky. This spectrum is dominated by blue light. Therefore, blue light is present everywhere as stray light or scattered light. Due to the sensitivity curves of the photoreceptors (cones) in the eye the stray light or the scattered light reduces the contrast. The M- and L-cones will catch blue light which will reduce the contrast because the output of both receptors is influenced by blue light. The contrast in a natural scene is perceived bigger when the difference of the input of the M- and L-cones is bigger. Therefore blue light acts against the strength of the perceived contrast.

Figure 4:
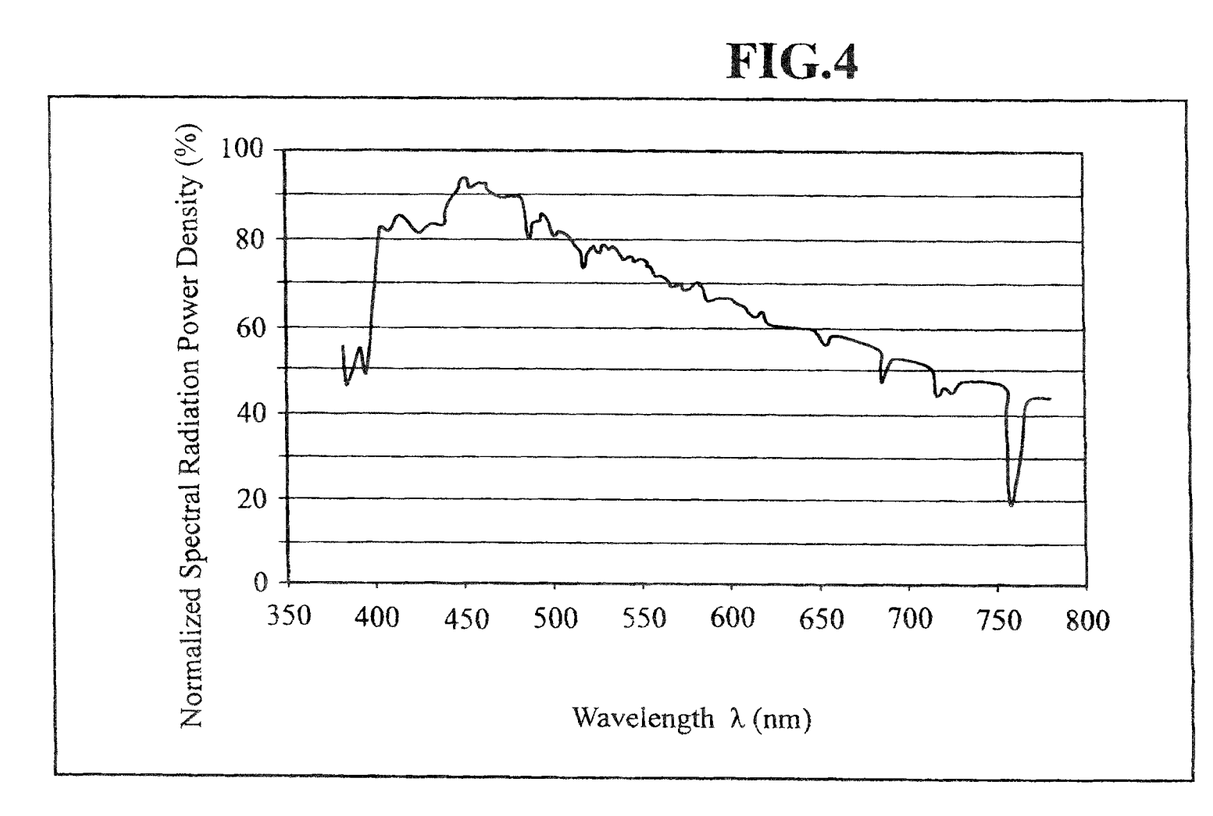
FIG. 4 is a spectral distribution of snow exposed to the blue sky.

It is well known that this effect of reduced contrast perception is in particular (but not exclusively) relevant in winter times in the presence of snow. FIG. 4 shows the spectral distribution of snow exposed to the blue sky. Lingelbach, B. and Jendrusch, G. explain in their paper entitled "Contrast Enhancing Filters in Ski Sports", which is disclosed in the Journal of ASTM International, 2(1), 1-8 (2005) that the maximal energy in the spectral power spectrum of snow when illuminated by the blue sky is concentrated in the blue range. The blue scattered light reduces information. All colors in every natural scenery are shifted toward blue. The colors are de-saturated.

A filter reducing the perceived blue portion is known to be able to compensate for this effect. If a portion of blue light is taken out, the colors become saturated again. Such filters are standard as so-called contrast enhancing filters.

Figure 5:
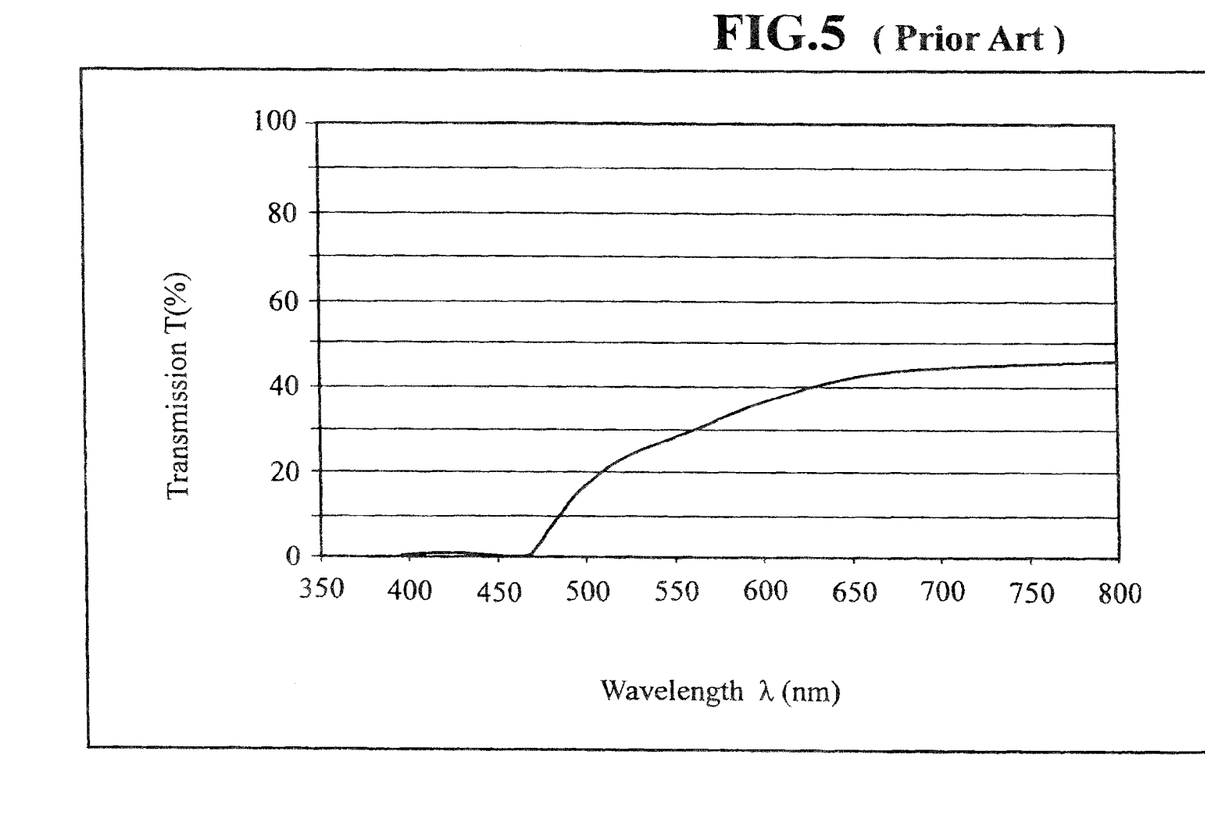
FIG. 5 is a spectral power transmission curve of a typical blue blocker according to the prior art.

In the extreme case, all incoming blue light may be taken out. A filter having such properties is called a blue blocker. FIG. 5 shows the power transmission spectrum of a typical blue blocker. Lingelbach, B. and Jendrusch, G. explain in the place cited above that "[a]t a first glance a "blue blocker" is good for skiing due to the tremendous contrast enhancement. On the other hand, there is maximum color distortion. The subjects denied using blue blocker for skiing because they are unsuitable for skiing. The visual system seems to need blue information for peripheral vision."

Figure 6:
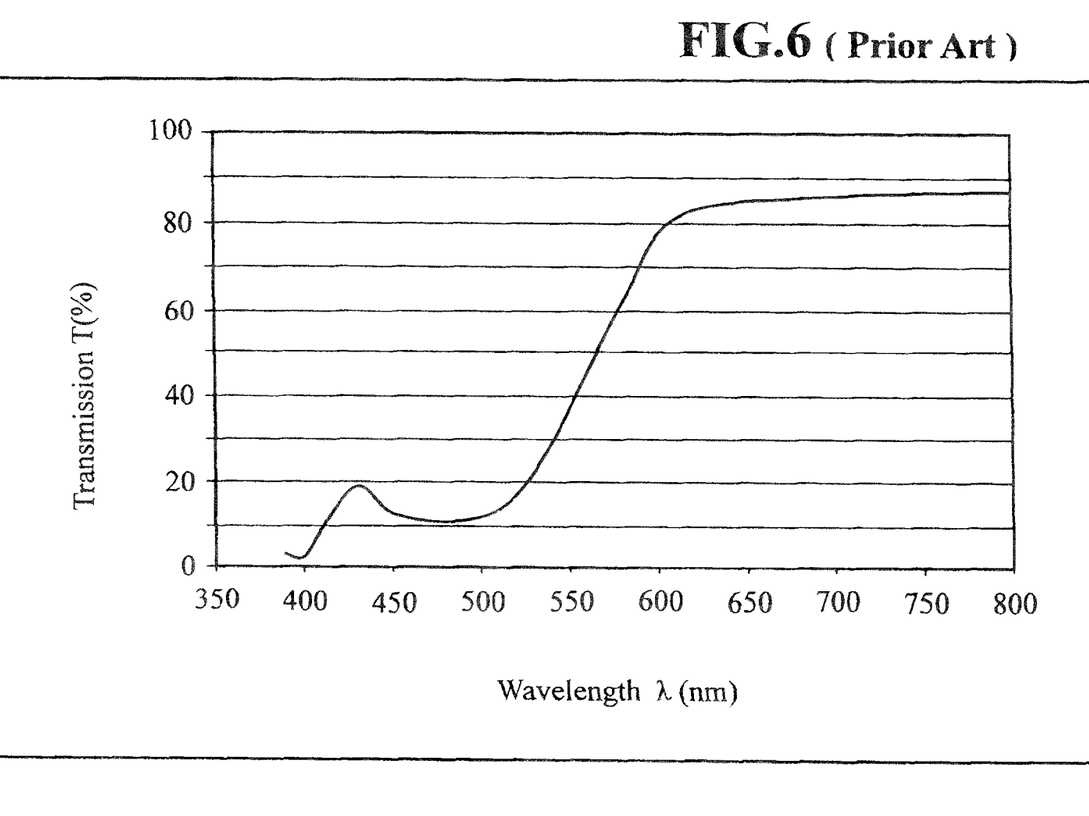
FIG. 6 is a spectral power transmission curve of a typical blue attenuator according to the prior art; and, FIG. 7 is a spectral distribution of snow exposed to direct sunlight.

Therefore, instead of pure blue blockers so called blue attenuators are used in order to also stimulate the S-cone cells which sense blue light, only. For example, a filter of type A as disclosed in U.S. Pat. No. 5,574,517 but provided for another purpose may be used. L.c., Lingelbach and Jendrusch found out that the visual system needs blue light at least in the periphery of the visual field for peripheral vision, movement control and balance. On the short wavelength end of the visual range ($\lambda$<420 nm) the sensitivity of the M- and L-cones converges to zero. But the sensitivity of the S-cones is still very high. A filter with a power transmission of about 15% in the range of 400 nm and a lower power transmission up to 500 nm has the advantage of the huge contrast enhancement of a blue blocker, but the blue information is still there. FIG. 6 shows spectral power transmission characteristics of this kind of filter according to the prior art. Similar curves are shown in Jendrusch, G. & Lingelbach, B.: "Optimales Sehen und Filtereinsatz beim Schneesport—Mythen und Fakten.", DOZ (Deutsche Optiker Zeitschrift) Optometrie & Fashion, 67(11), 2-7 (2012), Jendrusch, G. & Lingelbach, B.: "Farbfilter und polarisierende Filter beim Schneesport.", Aktuelle Kontaktologie (Zeitschrift für medizinische Kontaktologie und Sportophthalmologie), 8(19), 24-28 (2012), Jendrusch, G. & Lingelbach, B.: "Zur Wirkung von Farbfiltern und polarisierenden Filtern beim Schneesport." DOZ Optometrie & Fashion, 66 (11), 44-47 (2011) and Jendrusch, G., Ilg, A. & Lingelbach, B.: "Gut Sehen im Schnee. Optometrie", 56(4), 5-12 (2010).

Even though such known blue attenuating filters are proven, further improvement is desired. For example skiers or snow-boarders require a better contrast perception in order to recognize irregularities in the terrain, such as hummocks or hollows even under varying light conditions and snow being directly exposed to sun light. Lingelbach and Jendrusch already showed that polarizing filters are not useful to increase contrast perception in icy terrain. Details with respect to this finding are, for example, disclosed in Jendrusch, G. & Lingelbach, B.: "Farbfilter und polarisierende Filter beim Schneesport.", Aktuelle Kontaktologie (Zeitschrift für medizinische Kontaktologie und Sportophthalmologie), 8(19), 24-28 (2012) and Lingelbach, B.* & Jendrusch, G.: "Polarizing Filters in Ski Sports", Journal of ASTM International, 7(10), 1-7 (2010).

SUMMARY OF THE INVENTION

It is an object of the present invention to provide a filter for eye glasses (sun glasses), in particular a filter for ski goggles, providing enhanced contrast perception to the wearer even under varying light conditions and snow being directly exposed to sun light.

This object is achieved by an optical filter for eye glasses. The optical filter is in particular suitable for spectacle lenses and/or ski goggles and has a spectral power transmission curve of optical radiations with the following properties.

The spectral power transmission curve exhibits a local maximum spectral transmission of radiations in a first wavelength range between 380 nm and 420 nm. This maximum spectral transmission is a local maximum within the visible spectral range. Within the first wavelength range between 380 nm and 420 nm the maximum spectral transmission is an absolute maximum and therefore a global maximum since there is no further spectral transmission value larger than the maximum spectral transmission value.

The spectral power transmission curve further exhibits spectral transmissions of radiations in a second wavelength range between 420 nm and 500 nm which are lower than an upper threshold spectral transmission. The upper threshold spectral transmission is smaller than the maximum spectral transmission discussed in the foregoing paragraph.

According to the invention the maximum spectral transmission exceeds the values known from prior art, for example, those values which may be extracted from the spectral transmission curves disclosed in above cited publications of Jendrusch and Lingelbach. According to the invention the maximum spectral transmission is larger than 21%.

The inventor recognized that under varying light conditions and snow being directly exposed to sun light the overall light conditions are different from those assumed for calculating the filter characteristics disclosed in the above cited publications of Jendrusch and Lingelbach. The blue attenuation filters according to prior art having a peak transmission of around 15% in the range of 400 nm are sufficiently capable under shadowy light environment conditions. Then the spectrum of snow is similar to that shown in FIG. 3 because the snow reflects the light directly from the blue sky.

Figure 7:
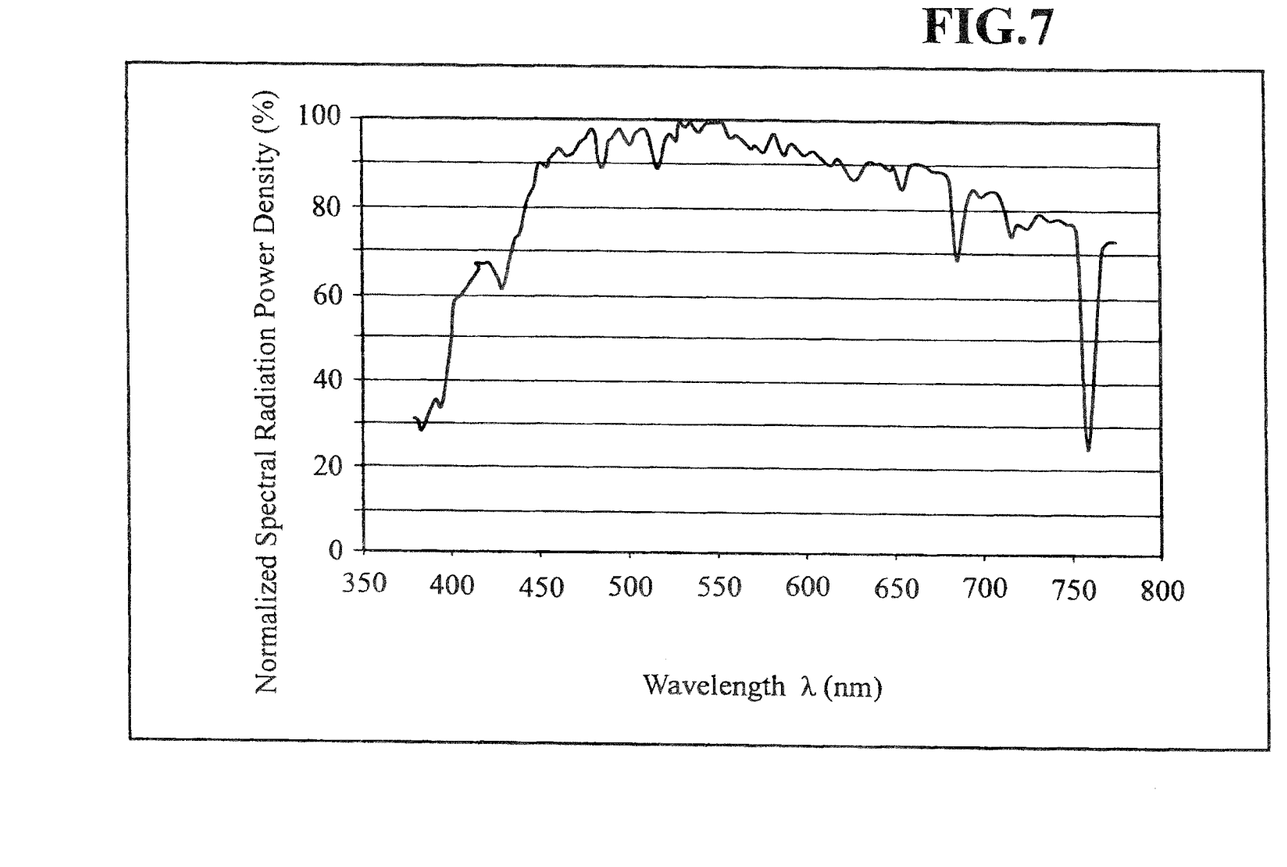

If the snow is exposed directly to the sun the spectrum of the snow will be slightly different as shown in FIG. 7. The blue light is even more dominant and will reduce color contrast. But at the low end the spectral power of the light is reduced compared to longer wavelengths. To increase the amount of blue light the transmission of a filter should be increased in the very short range up to 21%, preferably up to more than 22% or more than 23% or more than 24% or more than 25% or more than 26% or more than 27% or even more than 30%. Then the same strong effect of color contrast enhancement will happen as described above. If there is less amount of radiation in the very short wavelength range it should be compensated by a higher transmission of the filter in that range. In the range of about 420 nm<$\lambda$<500 nm the transmission should remain on a low level.

According to a specific embodiment the maximum spectral transmission of the optical filter according to the invention has values larger than 220 or larger than 23%, preferably larger than 24%, more preferably larger than 25%, further preferably larger than 26%, far further preferably larger than 27%, much far further preferably larger than 30%. The more the maximum spectral transmission in the wavelength region is increased under the further conditions outlined above the better the balance between color fidelity and contrast.

Presently, most ultra violet radiation blocking filters have a cut-off wavelength of around 400 nm. Therefore, from a production, that is, cost perspective, not necessarily from a physiological point of view, it is advantageous if the wavelength with the maximum spectral transmittance is in the wavelength region between 390 nm and 420 nm or between 395 nm and 420 nm or even between 400 nm and 420 nm. It is even possible that the maximum spectral transmittance is located at the lower end of the spectral range, for example, at a wavelength of around 380 nm, 390 nm, 395 nm or 400 nm.

The upper threshold spectral transmission may be smaller than 45% of the maximum spectral transmission. In order to further increase contrast enhancing properties the value may be smaller than 40% of the maximum spectral transmission or smaller than 35% of the maximum spectral transmission or smaller than 30% of the maximum spectral transmission or even smaller than 25% of the maximum spectral transmission. The smaller the value the less blue-perception of the M- and L-cones will occur.

The inventor recognized that not only relative spectral transmission values are relevant but also absolute values. He found out that it is advantageous if the upper threshold spectral transmission within the second wavelength range is smaller than 15% or smaller than 12% or even smaller than 10%.

Contrast enhancement will increase if the S-cones detect the blue portion of the light, only, and not the M- and L-cones. In other words, the invention is based in particular also on the idea to reduce the overlap of radiation detected by the S-cones on one side and the M- and L-cones on the other side. Therefore, it is advantageous if the second wavelength range is between 420 nm and 510 nm or between 420 nm and 520 nm or between 420 nm and 530 nm.

While filters for ski-goggles are not restricted by industrial standards the situation is different for spectacle lenses, for example, sun lenses, being destined for road traffic use. In particular Sec. 5.3.2 of prEN ISO 8980-3:2012.2 requires "The spectral transmission at any wavelength in the range 475 nm to 650 nm may be lower than iv." For safety reasons according to the invention, the spectral power transmission curve exhibiting spectral transmissions of radiations in the second wavelength range is larger than a lower threshold spectral transmission, whereby the lower threshold spectral transmission is larger than 0.5% of the total power transmission of radiations in a third wavelength range between 475 nm and 650 nm.

As is indicated above polarizing filters may have a disadvantageous effect on the contrast perception when used in ski-goggles. According to a specific embodiment of the invention the polarizing effect should be kept below a specific value at least in a fourth wavelength range between 600 nm and 800 nm. This specific value may be 5% or 2% or 1%. It is advantageous if the filter if intended for use in ski-goggles has no polarizing effect in the fourth wavelength range. It may have no polarizing effect at all.

The object is also achieved by an eye glass having an optical filter as described above.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
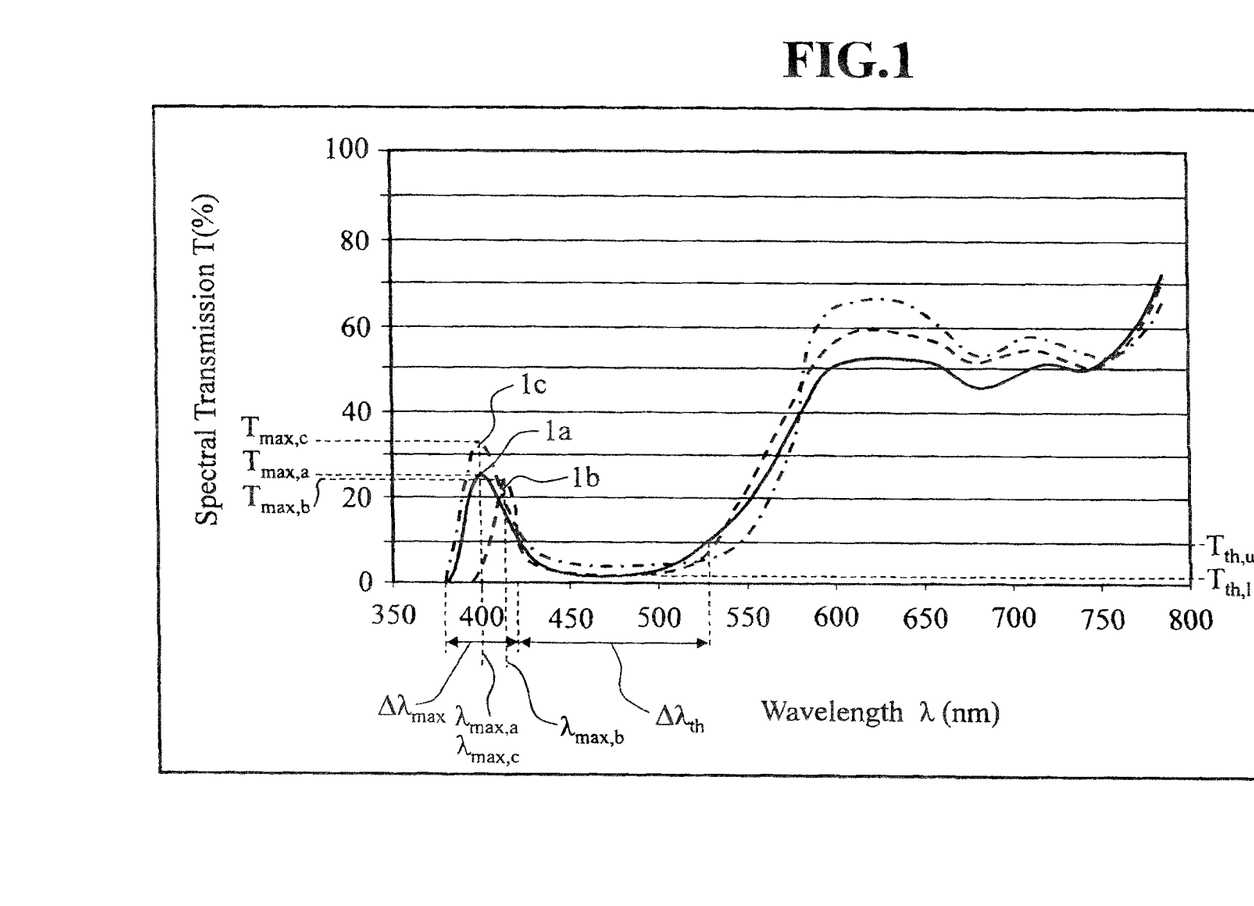
FIG. 1 shows spectral power transmission-curves of three different kinds of filters according to the invention. Curve 1a is a first filter (solid); curve 1b is a second filter (dashed); and, curve 1c is a third filter (dash-dotted)

FIG. 1 shows spectral power transmission-curves of three different kinds of optical filters according to the invention. The spectral power transmission-curve of the first optical filter is drawn as a solid line. The spectral power transmission-curve of the second optical filter is drawn as a dashed line. The spectral power transmission-curve of the third optical filter is drawn as a dash-dotted line.

The power transmission curve or power transmission characteristic is the mathematical function or graph that describes the power transmission fraction T of an optical filter as a function of wavelength $\lambda$.

All three optical filters are suitable for eye glasses, in particular for spectacle lenses or ski goggles. The spectral power transmission curves (1a, 1b, 1c) may be divided or separated into several characteristic wavelength ranges.

There is a first wavelength range $\Delta\lambda_{max}$ between 380 nm and 420 nm in which each of the spectral power transmission curves (1a, 1b, 1c) exhibit a local maximum. The value of this local maximum in the following is called maximum spectral transmission $T_{max}$. In order to be able to distinguish between the different maximum spectral transmissions $T_{max}$ of the different spectral power transmission curves (1a, 1b, 1c) of the three different optical filters, the different $T_{max}$ as well as the corresponding wavelengths $\lambda_{max}$ includes in addition one of the indices a), b) and c), respectively.

The first optical filter has a maximum spectral transmission $T_{max,a)}$ of 25.5% at a wavelength $\lambda_{max,a)}$ of 400 nm. The second optical filter has a maximum spectral transmission $T_{max,b)}$ of 23% at a wavelength $\lambda_{max,b)}$ of 415 nm. The third optical filter has a maximum spectral transmission $T_{max,c)}$ of 33% at a wavelength $\lambda_{max,c)}$ of 400 nm.

There is a second wavelength range $\Delta\lambda_{th}$ between 420 nm and 530 nm for the first and second optical filters (curves 1a and 1b) and in the case of the third optical filter (curve 1c) even between 420 nm and 550 nm in which the spectral transmission T is always below a certain threshold value $T_{th,u}$ of 10%. The threshold value $T_{th,u}$ in the following is called upper threshold spectral transmission. Since the maximum spectral transmission $T_{max}$ is a global maximum within the first wavelength range $\lambda\Delta_{max}$ the upper threshold spectral transmission $T_{th,u}$ is always lower than the value for the respective maximum spectral transmission $T_{max}$.

Characteristic of the invention is that the maximum spectral transmission $T_{max}$ is always larger than 21%. The upper threshold spectral transmission $T_{th,u}$ preferably is lower than 25% of the maximum spectral transmission $T_{max}$. Furthermore, it is preferred that the spectral range $\Delta\lambda_{th}$ within which the transmission T remains below the threshold value $T_{th,u}$ covers the complete region where both the S-cones and the M-cones are sensitive, that is, up to a wavelength $\lambda$ of approximately 550 nm. The third filter having the spectral power transmission-curve 1c already fulfills this rigorous criterion.

There are a lot of possibilities to configure such optical filters according to the invention. For example, U.S. Pat. No. 5,574,517 discloses the possibility to form filters allowing to discriminate between colors. The following paragraph discloses the principal steps in order to produce an optical filter suitable for ski goggles having the spectral power transmission curve 1a.

The production steps for an example of a ski goggle including an optical filter according to the invention are as follows:

Polycarbonate granules of optical grade (for example, sold by SABIC Innovative Plastics under the brand "LEXAN LS2") are mixed at room temperature with four different dyes, namely 1. Yellow (sold by Ciba under the brand "Oracet GHS")
2. Red (sold by Bayer under the brand "Macrolex E2G")
3. Violet (sold by Bayer under the brand "Macrolex B")
4. Blue (sold by BASF under the brand "Paliogen L6480")

After mixing, an extrusion process with a mono screw has been implemented in order to improve the color uniformity.

Subsequently, a dry process for 4 hours at 120° C. and an injection molding process in a ski goggle mold at 280-300° C. follows.

The ski goggle is then dipped in a hard coating resin followed by a polymerization process with thermal curing at 180° C.

It is possible to apply a mirror coating, for example, with a vacuum process according to U.S. Pat. No. 6,794,066 B2.

It is understood that the foregoing description is that of the preferred embodiments of the invention and that various changes and modifications may be made thereto without departing from the spirit and scope of the invention as defined in the appended claims.

What is claimed is:

1. An optical filter for eye glasses comprising:
   a filter medium defining a spectral power transmission curve of optical radiations;
   said spectral power transmission curve exhibiting a local maximum spectral transmission ($T_{max}$) of radiation in a first wavelength range ($\Delta\lambda_{max}$);
   said first wavelength range ($\Delta\lambda_{max}$) being between 380 nm and 420 nm;
   said spectral power transmission curve exhibiting spectral transmissions of radiation lower than an upper threshold spectral transmission ($T_{th,u}$) in a second wavelength range ($\Delta\lambda_{th}$);
   said second wavelength range ($\Delta\lambda_{th}$) being between 420 nm and 500 nm;
   said upper threshold spectral transmission ($T_{th,u}$) being less than said maximum spectral transmission ($T_{max}$); and,
   said maximum spectral transmission ($T_{max}$) being greater than 21%.

2. The optical filter of claim 1, wherein said maximum spectral transmission ($T_{max}$) is larger than 22%.

3. The optical filter of claim 1, wherein said first wavelength range ($\Delta\lambda_{max}$) is between 390 nm and 420 nm.

4. The optical filter of claim 1, wherein said first wavelength range ($\Delta\lambda_{max}$) is between 395 nm and 420 nm.

5. The optical filter of claim 1, wherein said first wavelength range ($\Delta\lambda_{max}$) is between 400 nm and 420 nm.

6. The optical filter of claim 1, wherein said upper threshold spectral transmission ($T_{th,u}$) is smaller than 45% of said maximum spectral transmission ($T_{max}$).

7. The optical filter of claim 1, wherein said upper threshold spectral transmission ($T_{th,u}$) is smaller than 40% of said maximum spectral transmission ($T_{max}$).

8. The optical filter of claim 1, wherein said upper threshold spectral transmission ($T_{th,u}$) is smaller than 35% of said maximum spectral transmission ($T_{max}$).

9. The optical filter of claim 1, wherein said upper threshold spectral transmission ($T_{th,u}$) is smaller than 30% of said maximum spectral transmission ($T_{max}$).

10. The optical filter of claim 1, wherein said upper threshold spectral transmission ($T_{th,u}$) is smaller than 25% of said maximum spectral transmission ($T_{max}$).

11. The optical filter of claim 1, wherein said upper threshold spectral transmission ($T_{th,u}$) is smaller than 15%.

12. The optical filter of claim 1, wherein said upper threshold spectral transmission ($T_{th,u}$) is smaller than 12%.

13. The optical filter of claim 1, wherein said upper threshold spectral transmission ($T_{th,u}$) is smaller than 10%.

14. The optical filter of claim 1, wherein said:
spectral power transmission curve in said second wavelength range ($\Delta\lambda_{th}$) exhibits spectral transmissions of radiations larger than a lower threshold spectral transmission ($T_{th,l}$);
said lower threshold spectral transmission ($T_{th,l}$) is larger than 0.5% of the total power transmission of radiations in a third wavelength range; and,
said third wavelength range is between 475 nm and 650 nm.

15. The optical filter of claim 1, wherein:
said filter medium further has a polarizing effect of less than 5% in a fourth wavelength range; and,
said fourth wavelength range is between 600 nm and 800 nm.

16. The optical filter of claim 1, wherein:
said filter medium further has a polarizing effect of less than 2% in a fourth wavelength range; and,
said fourth wavelength range is between 600 nm and 800 nm.

17. The optical filter of claim 1, wherein:
said filter medium further has a polarizing effect of less than 1% in a fourth wavelength range; and,
said fourth wavelength range is between 600 nm and 800 nm.

18. The optical filter of claim 1, wherein:
said filter medium further has a polarizing effect of 0% in a fourth wavelength range; and,
said fourth wavelength range is between 600 nm and 800 nm.

19. The optical filter of claim 1, wherein the optical filter is configured for spectacle lenses or ski goggles.

20. An optical filter for eye glasses comprising:
a filter medium defining a spectral power transmission curve of optical radiations;
said spectral power transmission curve exhibiting a local maximum spectral transmission ($T_{max}$) of radiation in a first wavelength range ($\Delta\lambda_{max}$);
said first wavelength range ($\Delta\lambda_{max}$) being between 380 nm and 420 nm;
said spectral power transmission curve exhibiting spectral transmissions of radiation lower than an upper threshold spectral transmission ($T_{th,u}$) in a second wavelength range ($\Delta\lambda_{th}$);
said second wavelength range ($\Delta\lambda_{th}$) being between 420 nm and 530 nm;
said upper threshold spectral transmission ($T_{th,u}$) being less than said maximum spectral transmission ($T_{max}$); and,
said maximum spectral transmission ($T_{max}$) being greater than 21%.

21. The optical filter of claim 20, wherein said second wavelength range ($\Delta\lambda_{th}$) is between 420 nm and 520 nm.

22. The optical filter of claim 20, wherein said second wavelength range ($\Delta\lambda_{th}$) is between 420 nm and 510 nm.

23. An eye glass comprising:
an optical filter defining a spectral power transmission curve of optical radiations;
said spectral power transmission curve exhibiting a local maximum spectral transmission ($T_{max}$) of radiation in a first wavelength range ($\Delta\lambda_{max}$);
said first wavelength range ($\Delta\lambda_{max}$) being between 380 nm and 420 nm;
said spectral power transmission curve exhibiting spectral transmissions of radiation lower than an upper threshold spectral transmission ($T_{th,u}$) in a second wavelength range ($\Delta\lambda_{th}$);
said second wavelength range ($\Delta\lambda_{th}$) being between 420 nm and 500 nm;
said upper threshold spectral transmission being less than said maximum spectral transmission ($T_{max}$); and,
said maximum spectral transmission ($T_{max}$) being greater than 21%.

24. Optical filter for eye glasses, in particular suitable for spectacle lenses or ski goggles, having a spectral power transmission curve of optical radiations, comprising:
said spectral power transmission curve exhibiting a local maximum spectral transmission ($T_{max}$) of radiations in a first wavelength range ($\Delta\lambda_{max}$), whereby said first wavelength range ($\Delta\lambda_{max}$) being between 380 nm and 420 nm;
said spectral power transmission curve exhibiting spectral transmissions of radiations in a second wavelength range ($\Delta\lambda_{th}$) being lower than an upper threshold spectral transmission ($T_{th,u}$), whereby said second wavelength range ($\Delta\lambda_{th}$) being between 420 nm and 500 nm and whereby said upper threshold spectral transmission ($T_{th,u}$) being less than said maximum spectral transmission (Tmax);
said maximum spectral transmission ($T_{max}$) being greater than 21%; and,
said upper threshold spectral transmission ($T_{th,u}$) being less than 45% of said maximum spectral transmission ($T_{max}$).

25. Optical filter for eye glasses, in particular suitable for spectacle lenses or ski goggles, having a spectral power transmission curve of optical radiations, comprising:
said spectral power transmission curve exhibiting a local maximum spectral transmission ($T_{max}$) of radiations in a first wavelength range ($\Delta\lambda_{max}$), whereby said first wavelength range ($\Delta\lambda_{max}$) being between 380 nm and 420 nm;
said spectral power transmission curve exhibiting spectral transmissions of radiations in a second wavelength range ($\Delta\lambda_{th}$) being lower than an upper threshold spectral transmission ($T_{th,u}$), whereby said second wavelength range ($\Delta\lambda_{th}$) being between 420 nm and 500 nm and whereby said upper threshold spectral transmission ($T_{th,u}$) being less than said maximum spectral transmission ($T_{max}$);

said maximum spectral transmission ($T_{max}$) being greater than 21%; and, said upper threshold spectral transmission ($T_{th, u}$) being less than 15%.

26. An eye glass comprising:

an optical filter defining a spectral power transmission curve of optical radiations;

said spectral power transmission curve exhibiting a local maximum spectral transmission ($T_{max}$) of radiations in a first wavelength range ($\Delta\lambda_{max}$), whereby said first wavelength range ($\Delta\lambda_{max}$) being between 380 nm and 420 nm;

said spectral power transmission curve exhibiting spectral transmissions of radiations in a second wavelength range ($\Delta\lambda_{th}$) being lower than an upper threshold spectral transmission ($T_{th,u}$), whereby said second wavelength range ($\Delta\lambda_{th}$) being between 420 nm and 500 nm and whereby said upper threshold spectral transmission ($T_{th,u}$) being less than said maximum spectral transmission (Tmax);

said maximum spectral transmission ($T_{max}$) being greater than 21%; and, said upper threshold spectral transmission ($T_{th,u}$) being less than 45% of said maximum spectral transmission ($T_{max}$).

27. An eye glass comprising:

an optical filter defining a spectral power transmission curve of optical radiations;

said spectral power transmission curve exhibiting a local maximum spectral transmission ($T_{max}$) of radiations in a first wavelength range ($\Delta\lambda_{max}$), whereby said first wavelength range ($\Delta\lambda_{max}$) being between 380 nm and 420 nm;

said spectral power transmission curve exhibiting spectral transmissions of radiations in a second wavelength range ($\Delta\lambda_{th}$) being lower than an upper threshold spectral transmission ($T_{th,u}$), whereby said second wavelength range ($\Delta\lambda_{th}$) being between 420 nm and 500 nm and whereby said upper threshold spectral transmission ($T_{th,u}$) being less than said maximum spectral transmission ($T_{max}$);

said maximum spectral transmission ($T_{max}$) being greater than 21%; and, said upper threshold spectral transmission ($T_{th,u}$) being less than 15%.

* * * * *

UNITED STATES PATENT AND TRADEMARK OFFICE
CERTIFICATE OF CORRECTION

PATENT NO. : 9,746,696 B2
APPLICATION NO. : 14/802921
DATED : August 29, 2017
INVENTOR(S) : Bernd Lingelbach It is certified that error appears in the above-identified patent and that said Letters Patent is hereby corrected as shown below:

In the Specification

In Column 4:
Line 3: delete "220" and substitute -- 22% -- therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*